United States Patent
Nieminen et al.

(10) Patent No.: US 6,578,075 B1
(45) Date of Patent: Jun. 10, 2003

(54) METHODS AND ARRANGEMENTS FOR DISTRIBUTING SERVICES AND/OR PROGRAMS IN A NETWORK ENVIRONMENT

(75) Inventors: Mika P. Nieminen, Espoo (FI); Karri Kalpio, Helsinki (FI); Jorma Rinkinen, Espoo (FI)

(73) Assignee: More Magic Holdings, Inc., Newton Corner, MA (US)

(*) Notice: Subject to any disclaimer, the term of this patent is extended or adjusted under 35 U.S.C. 154(b) by 0 days.

(21) Appl. No.: 09/214,268

(22) PCT Filed: Jul. 1, 1997

(86) PCT No.: PCT/FI97/00426
§ 371 (c)(1),
(2), (4) Date: Feb. 24, 1999

(87) PCT Pub. No.: WO98/00951

PCT Pub. Date: Jan. 8, 1998

(30) Foreign Application Priority Data

Jul. 2, 1996 (FI) .................................................. 962724
Jun. 24, 1997 (FI) .................................................. 972718

(51) Int. Cl.[7] .............................................. C06F 15/16
(52) U.S. Cl. ...................................... 709/221; 709/227
(58) Field of Search ........................... 705/35; 709/203, 709/206, 228, 315, 221, 227; 713/201; 717/11

(56) References Cited

U.S. PATENT DOCUMENTS

| | | | |
|---|---|---|---|
| 5,005,122 A | 4/1991 | Griffin et al. | 709/203 |
| 5,421,009 A | 5/1995 | Platt | 709/221 |
| 5,499,343 A | 3/1996 | Pettus | 709/203 |
| 5,588,003 A * | 12/1996 | Ohba et al. | 370/468 |
| 5,727,159 A * | 3/1998 | Kikinis | 709/246 |
| 5,812,768 A * | 9/1998 | Pagé et al. | 709/228 |
| 5,815,665 A | 9/1998 | Teper et al. | 709/229 |
| 5,933,816 A * | 8/1999 | Zeanah et al. | 705/35 |
| 5,944,824 A * | 8/1999 | He | 713/201 |
| 5,968,116 A * | 10/1999 | Day, II et al. | 709/202 |
| 5,999,741 A * | 12/1999 | May et al. | 717/11 |
| 6,076,109 A * | 6/2000 | Kikinis | 709/228 |
| 6,088,732 A * | 7/2000 | Smith et al. | 709/229 |
| 6,161,140 A * | 12/2000 | Moriya | 709/228 |
| 6,272,555 B1 * | 8/2001 | Gish | 709/315 |

FOREIGN PATENT DOCUMENTS

GB  2 251 358 A  7/1992

* cited by examiner

Primary Examiner—Christine Oda
Assistant Examiner—Walter Benson
(74) Attorney, Agent, or Firm—Arent Fox Kintner Plotkin & Kahn PLLC

(57) ABSTRACT

This invention relates to methods and systems for distributing a user interface for communications and/or services available in a communications network, wherein the user interface is independent from the terminal and/or applications. The method includes requesting an access to a least one desired service by a terminal, identifying the type of the requesting terminal, identifying and selecting the desired services, establishing a customized connection between the requested services and the requesting terminal on a basis of the identifying, and delivering at least one service program, dependent on the type of terminal and the requested service to the terminal.

32 Claims, 3 Drawing Sheets

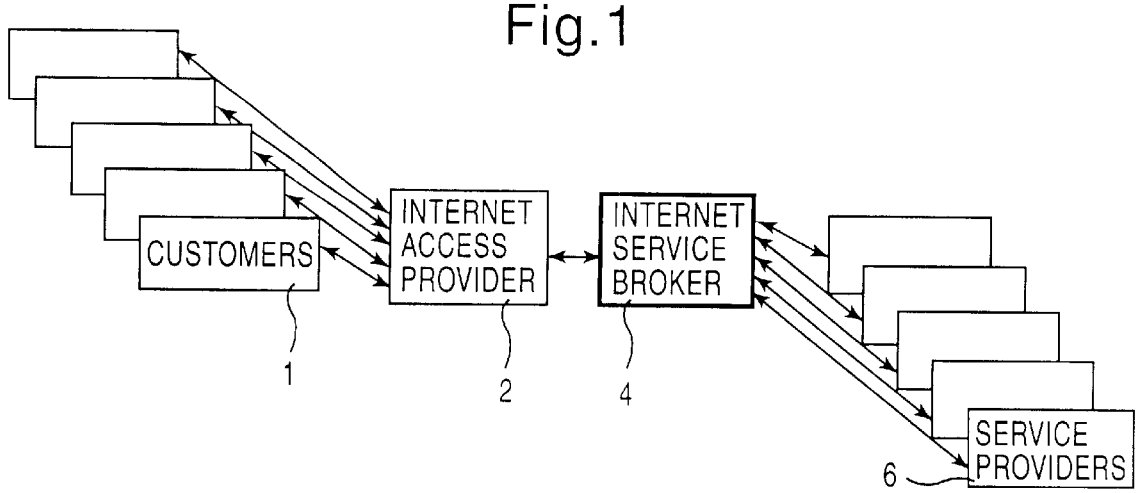
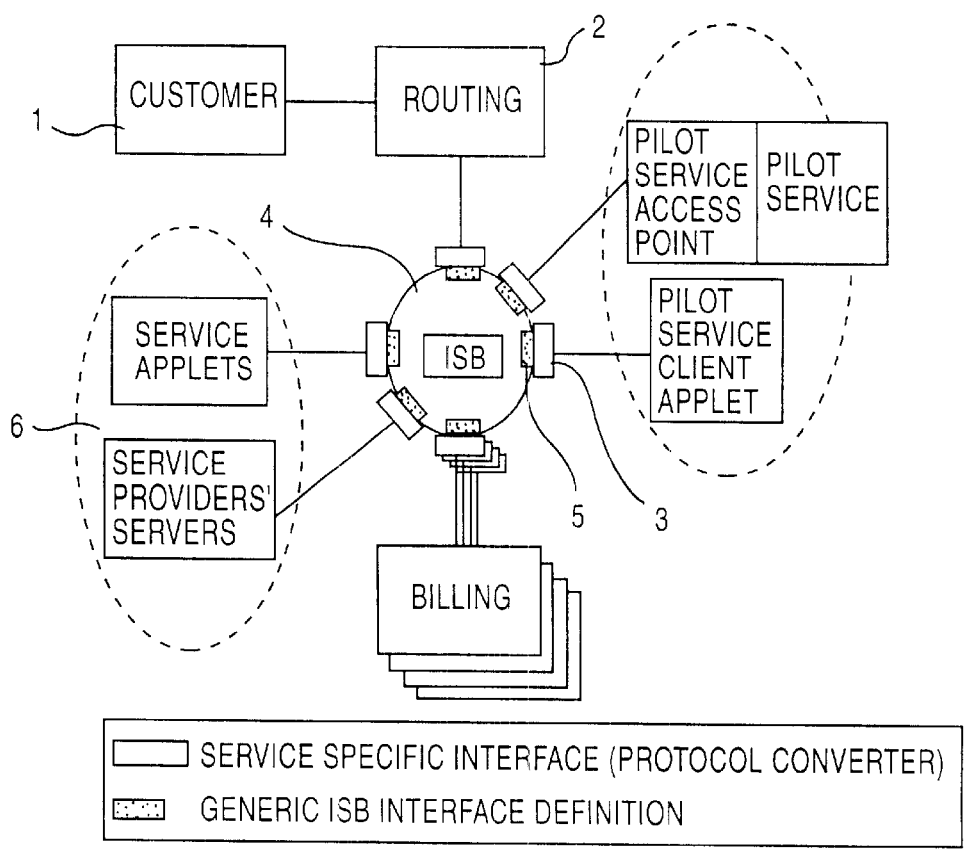

METHODS AND ARRANGEMENTS FOR DISTRIBUTING SERVICES AND/OR PROGRAMS IN A NETWORK ENVIRONMENT

FIELD OF THE INVENTION

The present invention relates to methods for distributing various services and/or programs in a network environment to one or several of the users ie. clients thereof. The invention relates further to arrangements for performing the distribution operations.

BACKGROUND OF THE INVENTION

In the present arrangements user terminals are connected to a public communications network, which at the present is in most cases the Internet, through an Internet operator (Access Provider). The operator allows the user to enter the Internet and to establish further connections and access various services that are provided by various service providers. The skilled person is familiar with the Internet and the communications networks in general, and thus they are not explained in more detail herein than by mentioning that the Internet is a global open communications network connecting a great number of local area networks, such as networks of various companies, universities and other organizations. These networks may be used by great number of independent work-stations and computer devices. An individual user may have a direct connection to these local area networks or they may be connected to them through a PSTN (Public Switched Telephone Network) or an ISDN (Integrated Digital Services network) using modems or similar devices. The two most often used communication protocols for the Internet are TCP and IP protocols (Transport Control Protocol and Internet Protocol, respectively). In most cases the service provider provides the various services by utilizing so called WWW (World Wide Web) and HTTP (HyperText Transfer Protocol) protocol to provide a graphical Internet interface for the user terminal which in this case is a data processing device, such as a microcomputer. The WWW contains eg. HTML documents (HyperText Markup Language) ie. "hyperdocuments", one such document forming one entity which can contain text, pictures, even moving pictures, sound, links to the other documents and even links to other services. The skilled person is aware that 'services' refers in this connection to various kinds of features, products, services such as electronic mail, electronic phone book, entertainment, assistance and advisory services etc., advertisement, games, videos and similar which are accessible through various communications networks.

The services may be free of charge or then there may be some Service or Access Provider dependent means and arrangements for the payment transactions.

U.S. Pat. Nos. 5,421,009 and 5,005,122 disclose prior art arrangements in which the management of and control of delivery of programs to client terminals is arranged to occur on basis of a databse containing all required information concerning the particular terminals to which the programs are to be delivered. The delivery of programs is initiated by a centralized server in the system. The prior art arrangements require a massive database and control program which are used in managing the delivery, this delivery occurring only in cases where the instructions to do so are coming from the system itself. This kind of management arrangement is often called to in the art as inventory driven delivery, as there has to be an existing inventory of the client terminals. The individual client terminals connected to the system have to be well known and carefully specified to a centralized server node managing the system. It is not possible for a such new terminal, which is not prior known to the centralized server, to receive any programs from the server.

The present arrangement has disadvantages eg. in that the operator does not usually provide anything else than the connection to the network, such as to the Internet. Therefore the user terminals have to be at least to some extend compatible with the operators hardware and software and especially with the hardware and software of the service providers. In most cases this is arranged such that each of the service providers has various versions of the same service such as to be compatible with various operators and also with various types of user terminals. This has lead into a situation in which the service providers are forced to implement several different version of their service programs etc. to be able to serve a wide variety of user which have accessed the service through various communications protocols, hardware etc., which in turn leads to problems in version management, updating and control and to an increase in the overall costs. In addition, the security and reliability, for instance for money transactions etc., has not been in a satisfying level. In the current situation the user must also have several different softwares or versions of the used software to be able to use the wide variety of the offered services. Usually every single service demands its own kind of program which has to be used in when accessing it. These various programs have to be separately provided and installed into the used data processing device prior to using the service.

SUMMARY OF THE INVENTION

Therefore it is an object of the present invention to overcome the disadvantages of the prior art solutions and to provide a new type of solution for accessing various services provided by means of communications networks.

An object of the present invention is also to provide a method and an arrangement by means of which the accessibility of services in public communications networks is improved.

An object of the present invention is also to provide a method and arrangement which enable the provision of tailored user interfaces from a common source of services.

An object of the present invention is also to provide a method and arrangement which enable an improved security and reliability of the connections between the user and the services.

It is also an object of the present invention to provide a method and an arrangement by means of which a centralized management of various services provided by various service providers is enabled.

It is also an object of the present invention to provide a method and an arrangement by means of which the amount of different types of software and hardware needed by the user to be able to use the various services is reduced.

A further object of the present invention is to provide a method and an arrangement, by means of which the amount of different software and hardware versions of the service providers is reduced, and in addition, by means of which the user is always provided with the latest possible updated versions of the software.

Other objects and advantages of the present invention will be brought out in the following part of the specification taken in conjunction with the accompanying drawings.

According one aspect of the invention, the objects are obtained by an method for distributing an user interface for communications and/or service or services available in a communications network, wherein said user interface is independent from used terminal means and/or used application or applications. The method comprises the following steps: requesting an access to at least one desired service by said terminal means, identifying the type of said terminal means requesting said service(s), by means of the access request and the connection used by the terminal means for requesting the access identifying and selecting the desired service(s), establishing a customized connection between the requested service(s) and said terminal means on basis of said identifying, of the type of the terminal and the desired service(s) delivering at least one service program dependent from the type of the terminal means and the requested service to said terminal means from a Connection Manager or by means of a Connection Manager for the duration of the established customized connection, whereafter the service program is used in the client terminal means for implementing the desired service during the established connection, and closing the connection between the connection manager and the client terminal means, whereby the connection instance becomes invalidated.

According to an alternative aspect, the objects are also obtained by a method for distributing services to client terminal means, which is comprising the following steps: requesting a certain service by the client terminal means, identifying the client terminal means and the type of the connection established between the client terminal means and a Connection Manager by means of the request and the connection used by the client terminal means for requesting the service generating in said Connection manager a terminal means profile on the basis of the identification, selecting a service program among a plurality of possibilities for a service program capable of executing said requested service on the basis of said terminal means profile, and delivering said customized service program to said terminal means from the Connection manager or by means of the Connection managers whereafter the service program is used in the client terminal means for implementing the desired service during the established connection, and closing the connection between the connection manager and the client terminal means whereby the connection instance becomes invalidated.

According to a preferred embodiment the inventive arrangement for distributing a user interface for communications and/or service or services of a communications network, wherein said user interface is independent from used terminal means and/or used application or applications, comprises terminal means for requesting an access to at least one desired service and for executing said service, and a Connection Manager arranged to identify the type of the terminal means requesting said service(s), based upon the access request and the connection established between the terminal means and the connection manager to identify and select the desired service(s), to establish a customized connection between the requested service(s) and the terminal means, on the basis of the identification and to deliver at least one service program dependent from the type of the terminal means, used connections and the requested service to said terminal means at least for the duration of the established customized connections, wherein the arrangement is such that the service program is used in the client terminal means for implementing the service during the established connection and closing the connection between the connection manager and the client terminal means invalidates the connection instance.

An alternative arrangement for distributing services to clients in a communications network comprises client terminal means for requesting and using a certain service and a Connection Manager for identifying the client terminal means and the type of the connection to it such that a terminal means profile becomes generated, for selecting a service program among a plurality of possibilities for a service program capable of executing said requested service on the basis of said terminal means profile, and for delivering said customized service program to said terminal means, wherein the arrangement is such that the service program is used in the client terminal means for implementing the service during the established connection and closing the connection between the connection manager and the client terminal means invalidates the connection instance.

Several advantages are obtained by means of the present invention, since the solution provides a simple, reliable and controllable manner for the service distribution. The inventive solution provides an overall control and management of the connections such that eg. a secure user identification and a better security is obtained while the accessibility of various services is improved and eased for the user. The solution provides means for customizing the connections between the service providers and the users such that neither the service providers or the users will necessarily have to have compatible hardware and/or software. Each user is provided with a personal service according to the facilities he/she may have and/or preferences he/she may have defined. The service providers receive savings in version control and support as they do no longer need to have a number of different kinds of software and hardware compatible with various kinds of protocols and user hardware and software. The solution will allow the service providers to easily create new services without a need to concentrate on any specific technical questions concerning the framework. The communications becomes dynamically routed through the network or even through various networks. In addition, the user can access several services using the same software he/she is familiar with, and the user is not forced to install and learn to use separate programs for every single service. The invention enables also a centralized registration and/or billing proceedings for multiple services.

In the following the present invention and the other objects and advantages thereof will be described by way of an example with reference to the annexed drawings, in which similar reference characters throughout the various figures refer to similar features. It should be understood that the following description of an example of the invention is not meant to restrict the invention to the specific forms presented in this connection but rather the present invention is meant to cover all modifications, similarities and alternatives which are included in the spirit and scope of the present invention, as defined by the appended claims.

BRIEF DESCRIPTION OF THE DRAWINGS

FIG. 1 is a schematic presentation of the basic arrangement according to the present invention;

FIG. 2 is a schematic presentation of the architecture according to one embodiment of the present invention;

DETAILED DESCRIPTION OF THE DRAWINGS

Figure 3:
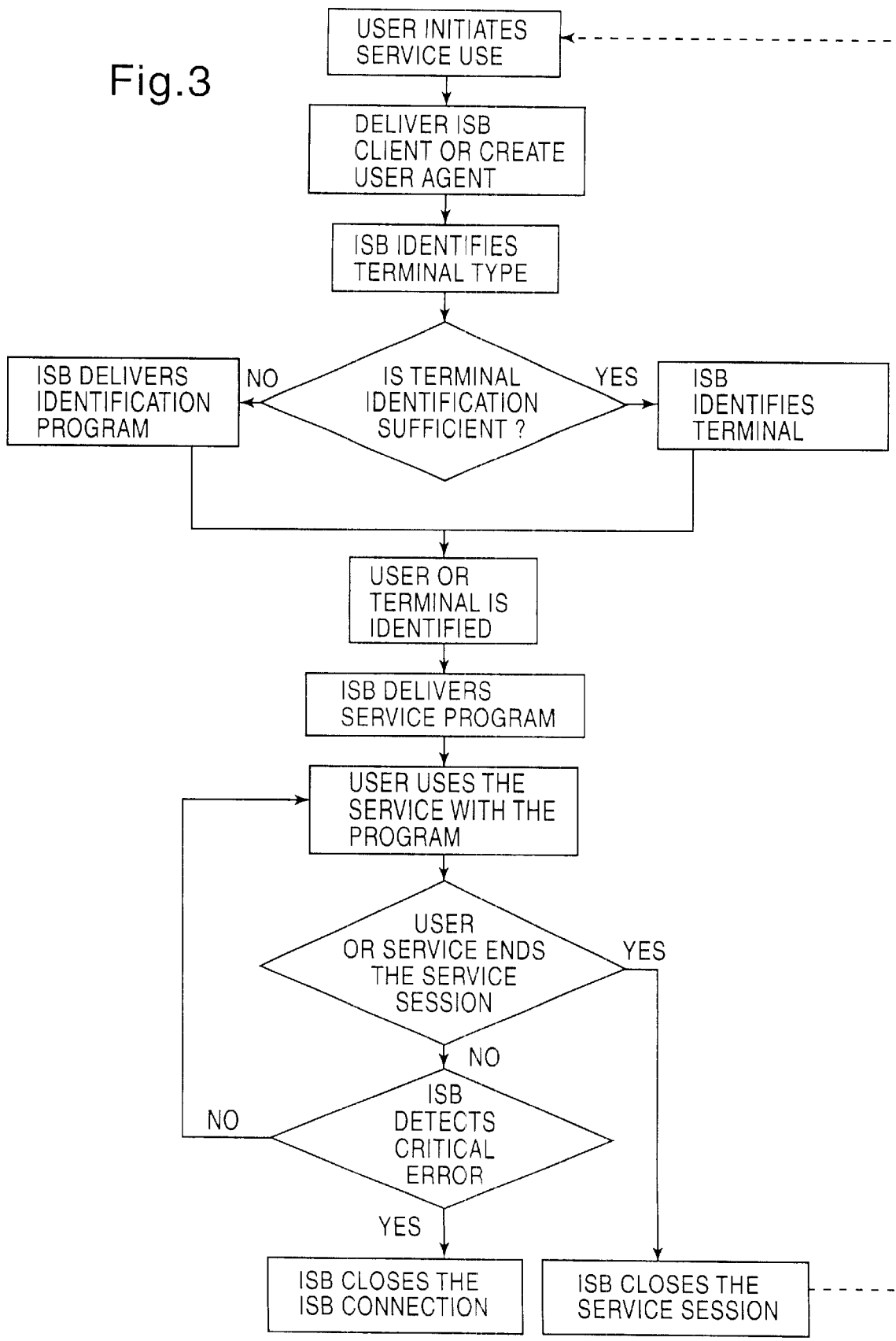
FIG. 3 discloses a flow chart according to one embodiment of the present invention.

FIG. 1 is a schematical presentation of one exemplifying arrangement according to the present invention. Users 1, or more precisely, terminal means of the users, are connected to an Internet Access Provider (IAP) 2. The user is the Client who wishes to use a certain service provided by a service provider 6 through a communications network or several networks. The terminal means 1 of the user can be a computer, such a PC (Personal Computer) or similar microcomputer or a workstation, or a telephone (either fixed land line telephone or a mobile telephone) or any other kind of device capable of establishing a connection to the IAP 2 or any other suitable Access Provider or network operator and receiving and/or sending data signals and processing them. The service provider 6 produces, maintains and manages various services to be used by the user in a per se known manner.

According to a preferred embodiment of the invention, no data relating to the use of the desired service or the programs necessary for the execution thereof is stored in the terminal means, except the software required for establishing the connection from the terminal means to the Access Provider 2.

In FIG. 1 the Access Provider 2 communicates with a separate Connection Manager, which in this example is referred to as-an Internet Service Broker (ISB) 4. The Connection Manager or ISB according to the present invention is, in turn, capable of communicating with a plurality of the service providers 6. The ISB is arranged to establish a secure connection between the user 1 and the various service providers, to identify an individual user, to deliver the service request of the user to the service provider and to provide a transfer path for the services between the service provider 6 and the user 1. The ISB further comprises a database, which contains necessary information for establishing the connections, such as information about the connection data (addresses etc.) of the service providers and the users.

The architecture of the ISB is illustrated in more detail by FIG. 2. The ISB 4 provides a centralized delivery of platform independent Client Programs to client or user terminals or interfaces 1. The Client Program is a program which can be run independently in the user terminal, and which enables the user to connect him/herself to the required service. The distribution and customizing thereof occurs in the ISB. In case the terminal means are of such design that they cannot execute any form of the Client Program, the ISB creates then an User Agent for the service. The User Agent acts similarly towards the Client Program, but is executed in the ISB instead of the user terminal.

The above means that most of the basic features of the Internet services (or services of other types of communications networks) are to be produced by the ISB. The distinctions and incompatibilities between various services are handled by tailored or customized stubs for every Client Program/service server pair. These well defined interfaces are made public so that the service providers connected to the ISB can easily generate their own client software to fulfil their specific needs. At present the most preferred means for producing such "Mobile Code" programs is the Java™ programming language developed by Sun Microsystems Inc.

The connections between the user and the ISB are provided by public communication network(s), such as the Internet, or private or private like communications network (s), such as PSTN (Public Switched telephone Network) or ISDN (Integrated Services Digital Network) eg. through a modem bank, public Internet with a verifiable origin, a verifiable Intranet, an ISB aware telephone to Internet gateway in a telephone switch or by any combination of above. The networks are capable of supporting various protocols and/or communications methods, such as TCP/IP (Transmission Control Protocol/Internet Protocol), UDP (User Data Protocol), HTTP (HyperText Transfer Protocol), FTP (File Transfer Protocol), GSM Short Message System (SMS) etc. The calls or requests from the terminal means 1 are routed by a suitable routing or switching means 2 to the ISB, such as by means of a local exchange, Internet Access provider or similar means for switching the call to the ISB. Suitable means for routing are per se known by the skilled person, and thus not explained in more detail. It is to be noted that in some instances the ISB may even be implemented within the switching apparatus of the Access Provider, and thus no routing outside the switching means 2 is required.

Each service managed by the ISB 4 has a special external adapter 3 which is arranged to convert the service specific protocol messages to be compatible with the internal data structures of the ISB. These converters 3 are customized for various services by modifying the generic external adapter.

The ISB 4 comprises further an internal adapter 5 and access points for the various external adapters 3. The internal adapters are enabling the services to have several service client programs of different kinds for several kinds of terminal types and communications methods. In other words, the arrangement is such that it enables the ISB to communicate with various kinds of services and/or service programs through various kinds of connections and/or protocols.

The ISB is arranged to handle internally only the headers or address information of the message packages, which are addressing the packet destinations and sources. This enables the ISB to handle the messages flow from and to the registered (and thus known) services.

The ISB introduces several kinds of Service Client Programs for individual services. The appropriate Client Program is deducted by the ISB, ie. the ISB is capable of modifying the requested service programs such that they will become compatible with the terminal means which requested to receive that certain service program or service including that program. Generally, it can be said that every service is mapped once into the ISB and many times out from the ISB. This means that for instance a telephone number database can offer it's services to various kinds of user groups, such as to computer users having a graphical user interface such as the World Wide web and the cellular phone users with a short message capability, by simply defining different Client Programs for each of these various user groups.

The ISB Service Client Program is implemented using a mobile code or user agents. In this context the mobile code means program or programs that can be loaded through a network and subsequently executed at the terminal end without a need for any other compilations of other measures. The following known trade names are referred to as examples of possible mobile codes: Java, Java Script, ActiveX and Telescript.

The protocols between the ISB and the Client and the ISB and the Service (ie. ISB-Client and ISB-Service) are implemented eg. by the service providers in a per se known manner. The Service-Client messages are capsuled or set inside ISB's own carrier messages within the ISB. It is preferred that the ISB concept only suggest it's own formats which then would enable it to offer an additional value added service or services. This additional embodiment will be discussed in more detail later. However, when operating in public networks, such as in the Internet, it is expected that most protocols are based on TCP/IP.

As is apparent from the above, the actual services are implemented outside the ISB. The mapping of them to several Client Programs by means of using the ISB allows an usage of the services by a large number of users and what is more essential, by various types of user terminals. The ISB does not present any restrictions whatsoever to the internal implementations of the service(s).

The server architecture of the ISB is intentionally kept very simple. Basically it is a collection of services which have a centralized management in the ISB server. As explained, the ISB comprises service stubs (well defined interfaces to the services) and outside the "core" it comprises public interfaces that implement the functionality of the stubs. This helps to keep the structural blocks small, robust and manageable. The ISB may contain a WWW server (World Wide Web server) that provides a subset of the functionality defined in the HTTP and HTTPS (HyperText Transfer Protocol Secure) protocols. Thus the first part thereof may be a light WWW server similar to the Web Request Broker™ by Oracle Corporation. It parses the request, transfers and possibly also dynamically builds Web Pages and Client Programs and provides the client with means for establishing new connections to the other parts of the service.

It is preferred that the ISB comprises a build-in Customer management Service. This creates, maintains and stores the user profiles and gives the external services an appropriate information about the customers and eg. their pre-defined selections and preferences. Customer Management Service also manages the connections to the internal database of the ISB.

The ISB itself can also be seen as a service. Any number of ISBs could be linked together in order to scale the system. Thus several ISBs would form a hierarchy where the various ISBs acquire services from each other but where the Client would still be served by means of the closest possible server or the "home" server.

The following gives an example of the hardware that could be utilized in the invention. However, the skilled person understands that other devices and software could also be used as well without departing from the scope of the invention.

The client or user who wishes to use the service provided by the ISB does not need any expensive equipments. The Java client can be run at an ordinary PC or similar having eg. an UNIX/X Windows™ or a Windows™ based windowing system. Internet TCP/IP connection is run over PPP (Point-to-Point) protocol. The used modem is preferably at least a V.34 modem at speed 28.8 kbit/s or an ISDN modem at speeds 64 or 128 kbit/s. The ISB itself is independent from the speed of the connections. Even ADSL modems capable to speeds of 2 Mbit/s are considered as appropriate in the future.

The ISB is implemented in a separate workstation (eg. Sun™ workstation) which is connected to the external services which in turn are implemented in a separate computers. The used network is eg. a physically separated communications network or a global communications network comprising well secured connections. The ISB itself does not cause much load on the workstation but since the operation requires a lot of I/O power, good network interfaces are required (ie. fast network cards, enough bandwidth etc.). The connections between the various components are preferably implemented using the TCP/IP protocols and fast local area networking techniques.

The inventive arrangement provides the user with a transparent but secure communications between the user and the service. The Connection Manager of the invention takes care of the task of establishing the connection and, if desired, the encryption of the data. Correspondingly, the Connection Manager implements features which are common to all services and value added services, such as are the payment interfaces.

Figure 4:
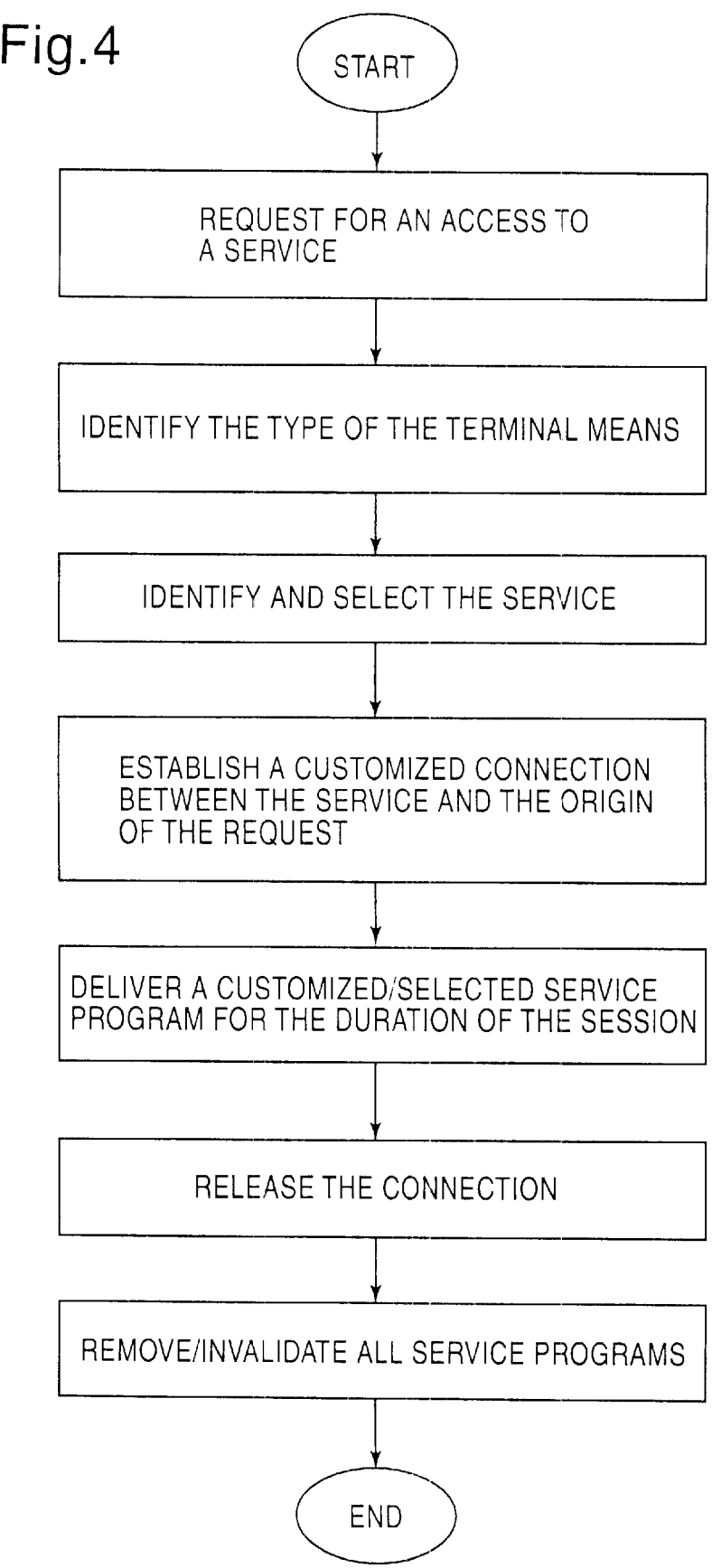
FIG. 4 discloses the basic steps in accordance with one embodiment of the present invention.

The main principles of the operation of the invention will now be discussed with a general reference to the flow charts of FIGS. 3 and 4.

The service provider registers all services provided by him to the database of the Connection Manager or ISB. A Client Program which is independent from the terminal means is established for each of the services offered through the Connection Manager. It is assumed that the data transfer path between the service provider and the Connection Manager is made secure. The service provider defines the data to be transferred such that it depends from the application, but preferably such that the Connection Manager always delivers at least the identity data of the user. When the user selects eg. by means of a web browser a service which requires an identification of the user or a secure transfer path, the request of the user is delivered to the Connection Manager.

The user places a requests through his/hers the terminal means for a certain service. This can be done eg. by selecting a certain hypertext link in a hypertext document, such as a HTML (HyperText Markup Language) page in the World Wide Web, WWW, or by means of numeric keys of a mobile station. Eg. when using the WWW, the user usually starts a WWW browser program and from there select an Universal Resource Locator (URL) address of the resource he/she wants to access. Thereafter the terminal sends a request for the service to the Connection Manager (in this example this is an Internet Service Broker, ISB). The format of this request may vary, and it depends from the type of the used terminal. A suitable format could be, for instance, a HTTP or TELNET (Text-Based Virtual terminal) protocol, a telephone tone dialling or a Short Message Service (SMS) a digital cellular phone, such as the GSM.

After receiving said request from the user terminal, the ISB creates an unique identifier to be used in real time management of the user connections. By using the information included in the first request of the particular connection the connection identifier is validated and adapted with the identity of the requested service access point. The format of the request and the data embedded into it enables the ISB to identify the type of the terminal and the capabilities and performance thereof. It is possible that in some instances this takes a longer and more complicated hand-shaking, i.e. exchange of information between the terminal and the ISB. For example, connections coming via a modem bank are identified as originating from terminals that can handle basic data transfer using certain protocols, connections using SMS gateway are identified as being SMS capable and so on. After this the ISB knows the minimum capabilities of the used terminal means.

The Connection Manager, ie. the ISB in the example, may generate a tailored identification program for each of the single connections. A connection particular identifier (ID) and a possible connection particular encryption key generated by the Connection Manager are attached to the identification program delivered to the user. In addition, the Connection Manager may register the service request into the database thereof and is thus capable of sending an advance information of a possible user in the near future to the requested service.

At this point the ISB establishes communication medium with the user. In case the terminal is capable of processing or executing the Mobile Code, the ISB then delivers, an appropriate Client Program enabling a simple dialog with the user. If the terminal cannot execute programs and thus maintain the connections with the ISB, the ISB will then create an user agent for the connection. The user agent is a computer program or a computer program connected to an external peripheral that transforms the requests and replies sent by the ISB into a form that the terminal is capable of handling, and correspondingly transforms the requests and replies by the user into a form the ISB can handle, and stores the state of the connection in such a way that it can be seen as an user with extended capabilities by the ISB. Thus said agent processes, sends and receives the terminal messages and holds the state of the current actions. An example of the user agent is the GSM short message handler which sends and receives GSM short messages and by this way creates an interface for the user.

After the ISB has successfully identified the type of the terminal and the requested service it may try to automatically verify the identity of the terminal, ie. without any help from the user. This is possible when the terminal has sent the service request by using some supported media. For instance, automatically verifiable media could consist of connections through telephone switches or modem banks that can be verified directly from the tele-operators or Internet Access Providers (IAP) databases (eg. the A-number information), connections from an Intelligent Network (IN) or connections carrying an IN identification data or requests carrying verified electronic signatures.

In case the Connection Manager is able to identify the terminal automatically and the requested service is such that it is possible for the identified user to access, the necessary information is sent to the service, and the service accepts this information to form the bases for the subsequent operations thereof.

On the other hand, in case the terminal identity cannot be identified automatically, or the requested service requires a personal or otherwise more secure identification, the ISB will deliver a separate identification program to the user. This program is selected and tailored in accordance with the information received in said first service request. This program executed in the user terminal may eg. ask from the user various identification data, such as the user identification and password, and thereafter transmit the user data to the ISB.

After the above stages, the terminal and/or even the user thereof, when necessary, are successfully identified. The ISB does not allow any unidentified or otherwise invalid connections either from an individual user or from the terminals, and thus all service request established through the ISB to the services are secure and reliable.

At this stage it is possible for the ISB to customize the client/agent software based on the information received and/or preferences of the user. Thus, subsequent to the identification, the ISB selects an appropriate service program among a plurality of alternative programs for executing the desired service and delivers it to the user. Said programs are selected to match the requirements of the user terminal. This means eg. that a web page or a browser executable Java program (applet) is given to a web browser and SMS text message is given to a GSM telephone. The requirements may also be predefined according to the personal requirements of individual users, ie. such that each user is provided with an individual service program or profile.

This platform or terminal dependent service program is adapted with an appropriate connection specific information, such as data encryption key or encryption key block to enable a secure communication, information about the user or his/hers earlier service history, such as personal preferences and settings. The service program is structured such that it cannot be used outside the current connection thereof to the ISB.

The service program is not necessarily an executable mobile code. It can also consist of concept of providing the user with additional rights to the already available resources or to allow a wider use of the network capacity. Thus no actual program is delivered to the user in this case. An example of this kind of operation is an online allocation of network bandwidth.

After the delivery, the user is able to use the Client Program and thus the service. The communications and data transfer between the user and the ISB, and the service and the ISB during the use of the actual service may be arranged to occur either via the ISB or directly between the user terminal and the service, while the ISB only monitors the connection. These connection types may also be changed during the connection. Independently from the type of the connection, the ISB receives predefined information from both parties concerning eg. the state of the connection and an information from the release of the connection, which information can be used eg. for charging purposes. In either case, the ISB manages the service connection during the entire duration thereof. It is also responsible of possible encryptions between the service providers and the users.

At the end, the ISB is notified when either the user or the service requests to end the session. The ISB may also in certain cases disconnect the connection without receiving any specific request for such, eg. when a potential security breach is found or an uncoverable network error occurs.

At the closing stage, the ISB sends an end message to the log and thus updates it and deletes the security keys and/or other possible keys and data relating to the particular service session. The current connection between the ISB and the user terminal may, however, be maintained as the user may wish to use another service.

Should a critical network error or a security break occur, the ISB may be arranged to terminate the ISB connection(s) and all currently active service programs. After this the ISB connection data is cast aside and the user must be re-identified when he/she wishes to use the service for the next time.

The arrangement is preferably such that no Client Programs, parts thereof or state information of the use will remain intentionally in the user terminal after the connection is released. Even in such case that the user would have copied the Client Program, the use thereof would be impossible without the connection keys generated by the Connection Manager.

It is also possible that the Connection Manager processes various information collected during the use. For instance, in case the services used by the user comprise purchase of products of various service providers, eg. a purchase of a product by means of a common electronic money, the Connection Manager is able to handle the distribution of the address information to the service providers. In addition, added value services, such as market researches based on the connection information, are possible.

The following is a more detailed description of one of such value added services enabled by means of the invention, and more precisely, a description of billing of various services and/or goods purchased through a communications network, such as Internet. According to the solution, the ISB manages the payment transactions instead of the individual service providers, as is the case in the prior art solutions. The ISB creates a common application programming interface for the billing, user identification and security connections. They are offered as easy-to-adopt add-ons that are used to connect to the desired services. This enables an easy, fast, cost efficient and straight-forward creation of new services.

As the user identification and the secure communication path are provided in accordance with the present invention, the billing information can be sent safely. The ISB billing service itself is directed to the service providers and not to the users. It is a well defined interface that implements a generic billing method. More precisely, it comprises two separate interfaces: an interface that is offered to the service providers and an interface that is used for connections to the external billing services. The billing module within the ISB core (see. FIG. 2) manages the conversions between the two entry points. It has also a connection to a Client Program in the user terminal (via the ISB) that is used for requesting a confirmation that the transactions is to be allowed before it is actually accomplished. It may also ask for the type of payment (eg. by credit/from balance in the user's account). Thus the user has to always confirm the payments.

The billing itself is a two stage operation. The service must first ask the ISB whether the user can be charged or not (eg. if he/she does have credit or balance left in his/hers account). The user may also give a limitation for the maximum amount to be debited. Then the ISB selects the billing method for that user and asks for the user's permission to prepare the bill. The result (yes/no) is then reported to the service. After the service is completed, the service sends the actual billing request to the ISB billing service and thus activates the actual payment (or billing) procedure.

Thus, the invention provides apparatus and methods by which a significant improvement can be achieved in the area of distributing various services through communications networks. The solution according to the present invention is easy and economical to implement by per se known components and reliable in use. It should be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

What is claimed is:

1. A method for distributing a user interface for communications and/or service or services available in a communications network, wherein said user interface is independent from used terminal and/or used application or applications, said method comprising the steps of:
   requesting an access to at least one desired service by said terminal,
   identifying the type of said terminal requesting said desired service by said access request and the connection and transfer rate used by the terminal for requesting the access,
   identifying and selecting the requested desired service,
   establishing a customized connection between the requested service and said terminal on a basis of said identifying of the type of the terminal and the connection and transfer rate used by the terminal and the requested desired service,
   delivering at least one service program dependent from the type of the terminal and the requested service to said terminal from a Connection Manager for the duration of the established customized connection,
   whereafter said service program is used in the terminal for implementing the requested desired service during the established connection, and
   closing the connection between the Connection Manager and the terminal whereby the connection instance becomes invalidated.

2. A method for distributing services to a client terminal comprising the steps of:
   requesting a certain service by the client terminal,
   identifying the client terminal and the type of the connection and transfer rate used by the terminal,
   establishing a customized connection between the client terminal and a Connection Manager based on said request and the connection and transfer rate used by the client terminal for requesting the service,
   generating in said Connection Manager a terminal profile on the basis of the identification,
   selecting a customized service program among a plurality of possibilities for a service program capable of executing said requested service on the basis of said terminal profile,
   delivering said customized service program to said terminal from the Connection Manager,
   whereafter said service program is used in the client terminal for implementing the desired service during the established connection, and
   closing the connection between the Connection Manager and the client terminal, whereby the connection instance becomes invalidated.

3. A method according to claim 1, wherein the identifying step comprises either automatically accomplished identification of said terminal or, in case the automatic identification cannot be accomplished or is not sufficient, sending of a specific identification program to said terminal.

4. A method according to claim 3, wherein the specific identification program is individually customized for each individual connection between said terminal and said Connection Manager on the basis of the results of the initial identification.

5. A method according to claim 1, wherein the data to be transferred from the Connection manager to the terminal is defined on basis of the information provided by the identifying step so as to be compatible with the terminal.

6. A method according to claim 1, wherein said selection of the service to be delivered to the terminal is further based on individual preferences and parameters of the user.

7. A method according to claim 1, further comprising overall management and/or monitoring of the communications and the state thereof between said terminal and the service during the entire duration of the connection.

8. A method according to claim 1, further comprising provision of value added services, said value added services including billing services, by the Connection Manager.

9. A method according to claim 1, further comprising steps for creating a user agent for such connections and/or terminals which are not capable of handling the requested service programs, and thereafter executing said service program by the user agent in the Connection Manager instead of said terminal.

10. A method according to claim 1, further comprising a step for sending a client program from the Connection Manager to the terminal.

11. A method according to claim 1, comprising a step of producing of at least a part of the features of various services by means of the Connection Manager.

12. A method according to claim 1, further comprising a step for linking at least two Connection Managers together.

13. A method according to claim 1, further comprising a step for removing or invalidating all programs delivered to the terminal from the Connection Manager at the time or after the connection is released.

14. A system for distributing a user interface for communications and/or service or services of a communications network, wherein said user interface is independent from used terminal and/or used application or applications, said arrangement comprising:
 a terminal for requesting an access to at least one desired service and for executing said service,
 a Connection Manager arranged to identify the type of the terminal and transfer rate of the terminal requesting said service on a basis of the access request and the connection and transfer rate established between the terminal and the Connection Manager, to identify and select the requested desired service, to establish a customized connection between the requested service and the terminal on basis of said identification and requested desired service, and to deliver at least one service program dependent from the type of the terminal, used connections, and the requested service to said terminal for the duration of the established customized connection, wherein the arrangement is such that said service program is used in the terminal for implementing the requested service during the established connection and that closing of the connection between the Connection Manager and the terminal, invalidates the connection instance.

15. A system for distributing services to clients in a communications network, comprising:
 client terminal for requesting and using a certain service,
 a Connection Manager for identifying the client terminal on basis of the request and a type of connection and transfer rate used for the request, generating a terminal profile for selecting a customized service program among a plurality of possibilities for a service program capable of executing said requested service on the basis of said terminal profile and transfer rate, establishing a customized connection between the terminal and the Connection Manager based on the terminal profile and the requested service, and delivering said customized service program to said terminal, wherein the arrangement is such that said service program is used in the terminal for implementing the service during the established connection and that closing of the connection between the Connection Manager and the terminal invalidates the connection instance.

16. A system according to claim 14, the Connection manager comprising
 an interface towards various services,
 an interface towards said terminal, and
 an adapter for adapting the service program(s) such that the service program(s) become(s) compatible with the terminal.

17. A system according to claim 16, wherein the adapter comprises a further external adapter arranged to convert the service specific protocol messages to be compatible with the internal data structures of the Connection Manager and an internal adapter arranged to enable the Connection Manager to communicate with various kinds of services and service programs through various kinds of connections and/or protocols.

18. A system according to claim 16, wherein the adapter is arranged to store a state of the connection.

19. A method according to claim 2, wherein the identifying step comprises either automatically accomplished identification of said terminal or, in case the automatic identification cannot be accomplished or is not sufficient, sending of a specific identification program to said terminal.

20. A method according to claim 19, wherein the specific identification program is individually customized for each individual connection between said terminal and said Connection Manager on the basis of the results of the initial identification.

21. A method according to claim 2, wherein the data to be transferred from the Connection manager to the terminal is defined on basis of the information provided by the identifying step so as to be compatible with the terminal.

22. A method according to claim 2, wherein said selection of the service to be delivered to the terminal is further based on individual preferences and parameters of the user.

23. A method according to claim 2, further comprising overall management and/or monitoring of the communications and the state thereof between said terminal and the service during the entire duration of the connection.

24. A method according to claim 2, further comprising provision of value added services, said value added services including billing services, by the Connection Manager.

25. A method according to claim 2, further comprising steps for creating an user agent for such connections and/or terminals which are not capable of handling the requested service programs, and thereafter executing said service program by the user agent in the Connection Manager instead of said terminal.

26. A method according to claim 2, further comprising a step for sending a client program from the Connection Manager to the terminal.

27. A method according to claim 2, comprising a step of producing of at least a part of the features of various services by the Connection Manager.

28. A method according to claim 2, further comprising a step for linking at least two Connection Managers together.

29. A method according to claim 2, further comprising a step for removing or invalidating all programs delivered to the terminal from the Connection Manager at the time or after the connection is released.

30. A system according to claim 15, the Connection manager comprising an interface towards various services,
 an interface towards said terminal, and
 an adapter for adapting the service program(s) such that the service program(s) become(s) compatible with the terminal.

31. A system according to claim 30, wherein the adapter comprises a further external adapter arranged to convert the service specific protocol messages to be compatible with the internal data structures of the Connection Manager and an internal adapter arranged to enable the Connection Manager to communicate with various kinds of services and service programs through various kinds of connections and/or protocols.

32. A system according to claim 30, wherein the adapter is arranged to store a state of the connection.

* * * * *